US011329297B2

(12) United States Patent
Oyama et al.

(10) Patent No.: US 11,329,297 B2
(45) Date of Patent: May 10, 2022

(54) FUEL CELL METAL SEPARATOR AND POWER GENERATION CELL

(71) Applicant: HONDA MOTOR CO., LTD., Tokyo (JP)

(72) Inventors: Satoshi Oyama, Wako (JP); Masaaki Sakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 557 days.

(21) Appl. No.: 15/884,420

(22) Filed: Jan. 31, 2018

(65) Prior Publication Data

US 2018/0226665 A1    Aug. 9, 2018

(30) Foreign Application Priority Data

Feb. 3, 2017    (JP) .............................. JP2017-018843

(51) Int. Cl.
| *H01M 8/0297* | (2016.01) |
| *H01M 8/0206* | (2016.01) |
| *H01M 8/0258* | (2016.01) |
| *H01M 8/0276* | (2016.01) |
| *H01M 8/0273* | (2016.01) |

(Continued)

(52) U.S. Cl.
CPC ....... *H01M 8/0297* (2013.01); *H01M 8/0206* (2013.01); *H01M 8/0258* (2013.01); *H01M 8/0273* (2013.01); *H01M 8/0276* (2013.01); *H01M 8/0286* (2013.01); *H01M 8/1004* (2013.01)

(58) Field of Classification Search
CPC ............. H01M 8/0297; H01M 8/0286; H01M 8/1004; H01M 8/0206; H01M 8/0258; H01M 8/0276; H01M 8/0273
See application file for complete search history.

(56) References Cited

U.S. PATENT DOCUMENTS 6,605,380 B2    8/2003    Chen et al.
2007/0207365 A1*    9/2007    Ohnuma ............. H01M 8/0297
429/434

(Continued)

FOREIGN PATENT DOCUMENTS

JP    2007-035296    2/2007
JP    2013-119946    6/2013

(Continued)

OTHER PUBLICATIONS

Japanese Office Action for Japanese Patent Application No. 2017-018843 dated Jul. 24, 2018.

(Continued)

*Primary Examiner* — Michael L Dignan
(74) *Attorney, Agent, or Firm* — Amin, Turocy & Watson, LLP

(57) ABSTRACT

A fuel cell metal separator is stacked on a membrane electrode assembly to form a power generation cell. The membrane electrode assembly includes an electrolyte membrane and electrodes provided on both sides of the electrolyte membrane, respectively. The fuel cell metal separator includes a bead seal for preventing leakage of a fuel gas, an oxygen-containing gas, or a coolant as fluid. A top of the bead seal is configured to become flat in cross section by application of a compression load to the power generation cell.

12 Claims, 10 Drawing Sheets

(51) Int. Cl.
*H01M 8/0286* (2016.01)
*H01M 8/1004* (2016.01)

(56) References Cited

U.S. PATENT DOCUMENTS

| | | | | |
|---|---|---|---|---|
| 2009/0239128 | A1* | 9/2009 | Keyser | H01M 8/2483 |
| | | | | 429/432 |
| 2010/0196784 | A1* | 8/2010 | Kimura | H01M 8/0273 |
| | | | | 429/483 |
| 2010/0260928 | A1* | 10/2010 | Hasegawa | H01M 8/0228 |
| | | | | 427/115 |
| 2015/0266078 | A1* | 9/2015 | Hirata | H01M 8/0202 |
| | | | | 72/327 |
| 2016/0102410 | A1* | 4/2016 | Speidel | H01M 8/04007 |
| | | | | 429/434 |
| 2016/0305548 | A1 | 10/2016 | Watanabe et al. | |
| 2017/0084929 | A1* | 3/2017 | Xu | H01M 8/0276 |
| 2017/0194655 | A1* | 7/2017 | Yoshida | H01M 8/0254 |
| 2017/0229719 | A1* | 8/2017 | Lai | H01M 8/0284 |
| 2018/0269497 | A1* | 9/2018 | Kunz | H01M 8/0206 |

FOREIGN PATENT DOCUMENTS

| | | |
|---|---|---|
| JP | 2014-049383 | 3/2014 |
| JP | 2014-072140 | 4/2014 |
| JP | 2016-048620 | 4/2016 |
| JP | 2016-156448 | 9/2016 |
| JP | 2016-162652 | 9/2016 |
| JP | 2017-162795 | 9/2017 |

OTHER PUBLICATIONS

Japanese Office Action for Japanese Patent Application No. 2017-018843 dated Feb. 19, 2019.

* cited by examiner

FUEL CELL METAL SEPARATOR AND POWER GENERATION CELL

CROSS-REFERENCE TO RELATED APPLICATION

This application is based upon and claims the benefit of priority from Japanese Patent Application No. 2017-018843 filed on Feb. 3, 2017, the contents of which are incorporated herein by reference.

BACKGROUND OF THE INVENTION

Field of the Invention

The present invention relates to a fuel cell metal separator equipped with a bead seal and a power generation cell.

Description of the Related Art

A fuel cell (power generation cell) includes a membrane electrode assembly (MEA) and separators (bipolar plates) sandwiching the membrane electrode assembly. An anode is provided on one surface of an electrolyte membrane and a cathode is provided on the other surface of the electrolyte membrane to form the membrane electrode assembly. The electrolyte membrane is a polymer ion exchange membrane. Such a fuel cell is known conventionally. Normally, a predetermined number of power generation cells are stacked together to form a fuel cell stack. For example, the fuel cell stack is mounted in a fuel cell vehicle (fuel cell electric vehicle, etc.) as an in-vehicle fuel cell stack.

In some cases, metal separators are used as separators. In this regard, seal members are provided for the metal separators for preventing leakage of an oxygen-containing gas and a fuel gas as reactant gases, and a coolant. Elastic rubber seals of fluorine based materials or silicone are used as the seal members. This pushes up the cost disadvantageously.

In this regard, for example, as disclosed in U.S. Pat. No. 6,605,380, instead of the elastic rubber seals, seal beads (bead seals) are formed on the metal separators. The bead seals have a shape expanded from flat portions (base plates) of the metal separators. Since the bead seals are formed by press forming, the production cost is low advantageously.

SUMMARY OF THE INVENTION

The metal separators and the MEAs are stacked together, and a tightening load is applied to the metal separators and the MEAs in a stacking direction to form an assembly as a fuel cell stack. In the conventional bead seal, the center at the top of the bead seal (center in the bead width direction) is deformed, and consequently, the surface pressure is decreased relatively. Conversely, at shoulders of the top of the bead seal (both ends in the bead width direction), the surface pressure is increased relatively. Therefore, the surface pressure is low at some positions in the seal width direction. Under the circumstances, it has been pointed out that the desired sealing performance may not be secured depending on the surface shape of the bead seal (shape viewed in the stacking direction).

The present invention has been made taking the problems into account, and an object of the present invention is to provide a fuel cell in which it is possible to provide a fuel cell metal separator and a power generation cell in which it is possible to achieve the uniform surface pressure distribution in the seal width direction of a bead seal, and improve the sealing performance.

In order to achieve the above object, the present invention provides a fuel cell metal separator configured to be stacked on a membrane electrode assembly in a stacking direction to form a power generation cell. The membrane electrode assembly includes an electrolyte membrane and electrodes provided on both sides of the electrolyte membrane. The fuel cell metal separator includes a bead seal protruding in the stacking direction and configured to prevent leakage of a fuel gas, an oxygen-containing gas, or a coolant as fluid. A compression load is applied to the power generation cell in the stacking direction, and a top of the bead seal is configured to become flat in cross section by application of the compression load to the power generation cell.

Preferably, the bead seal has a curved shape in a plan view as viewed in the stacking direction.

Preferably, a passage extends through the fuel cell metal separator in the stacking direction, and is configured to supply or discharge the fluid, the bead seal includes a passage bead surrounding the passage, and the curved shape is positioned between a corner and another corner of the passage bead.

Preferably, a resin seal member having a constant thickness in a seal width direction is provided at the top.

Preferably, in a state where the compression load is not applied, the top has a curved shape in cross section expanded in a protruding direction of the bead seal.

Preferably, a height of the curved shape of the top is made larger as the compression load to be applied increases.

Further, the present invention provides a power generation cell including a membrane electrode assembly including an electrolyte membrane and electrodes provided on both sides of the electrolyte membrane and metal separators stacked on both sides of the membrane electrode assembly in a stacking direction, respectively. Each of the fuel cell metal separators includes a bead seal protruding in the stacking direction and configured to prevent leakage of a fuel gas, an oxygen-containing gas, or a coolant as fluid. A compression load is applied to the power generation cell in the stacking direction. A top of the bead seal is configured to become flat in cross section by application of the compression load to the power generation cell.

In the fuel cell metal separator and the power generation cell of the present invention, the top of the bead seal is configured to become flat in cross section by application of the compression load to the power generation cell. Therefore, when the power generation cell is compressed, the top of the bead seal becomes flat. Accordingly, it is possible to prevent local decrease or increase in the seal surface pressure. Accordingly, it becomes possible to achieve the uniform surface pressure in the seal width direction, and improve the sealing performance.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
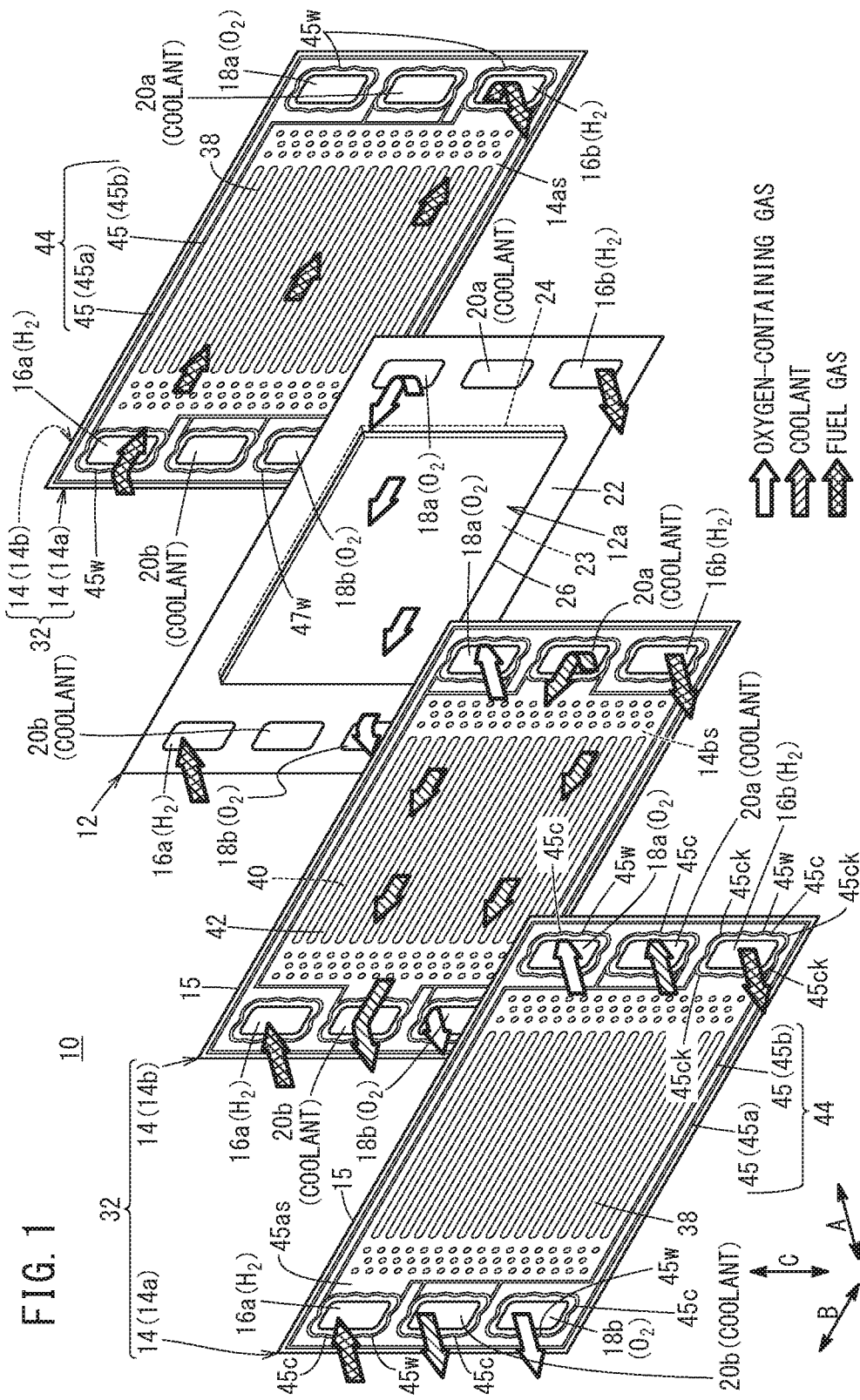
FIG. 1 is an exploded perspective view showing a power generation cell.

Hereinafter, preferred embodiments of a fuel cell metal separator and a power generation cell according to the present invention will be described with reference to the accompanying drawings. In a second embodiment, the constituent elements that are identical or similar to those of a first embodiment are labeled with the same reference numerals, and detailed description is omitted.

Figure 2:
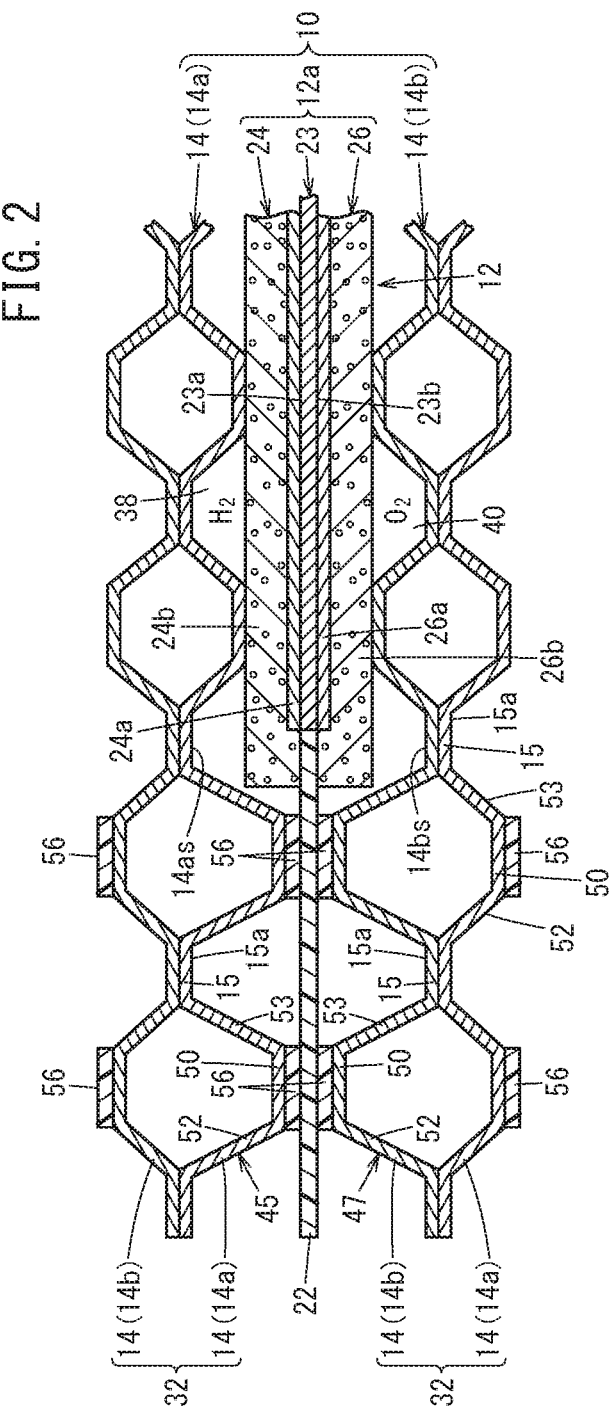
FIG. 2 is a cross sectional view showing a power generation cell shown in FIG. 1.

As shown in FIGS. 1 and 2, a power generation cell (fuel cell) 10 includes a resin frame equipped membrane electrode assembly (hereinafter referred to as a "resin frame equipped MEA 12"), and metal separators 14 provided on both sides of the resin frame equipped MEA 12, respectively. The power generation cell 10 is a laterally elongated (or longitudinally elongated) rectangular solid polymer electrolyte fuel cell.

For example, a plurality of the power generation cells 10 are stacked together in a horizontal direction indicated by an arrow A or in a gravity direction indicated by an arrow C, and a tightening load (compression load) is applied to the power generation cells 10 in the stacking direction to form a fuel cell stack. For example, the fuel cell stack is mounted as an in-vehicle fuel cell stack, in a fuel cell electric automobile (not shown).

As shown in FIG. 1, at one end of the power generation cell 10 in the horizontal direction indicated by the arrow B, an oxygen-containing gas supply passage 18a, a coolant supply passage 20a, and a fuel gas discharge passage 16b are provided. The oxygen-containing gas supply passage 18a, the coolant supply passage 20a, and the fuel gas discharge passage 16b extend through the power generation cell 10 in the stacking direction indicated by the arrow A. The oxygen-containing gas is supplied through the oxygen-containing gas supply passage 18a, and the coolant is supplied through the coolant supply passage 20a. A fuel gas such as a hydrogen-containing gas is discharged through the fuel gas discharge passage 16b. The oxygen-containing gas supply passage 18a, the coolant supply passage 20a, and the fuel gas discharge passage 16b are arranged in the vertical direction indicated by the arrow C.

At another end of the power generation cell 10 in the direction indicated by the arrow B, a fuel gas supply passage 16a for supplying the fuel gas, a coolant discharge passage 20b for discharging the coolant, and an oxygen-containing gas discharge passage 18b for discharging the oxygen-containing gas are provided. The fuel gas supply passage 16a, the coolant discharge passage 20b, and the oxygen-containing gas discharge passage 18b extend through the power generation cell 10 in the direction indicated by the arrow A. The fuel gas supply passage 16a, the coolant discharge passage 20b, and the oxygen-containing gas discharge passage 18b are arranged in the direction indicated by the arrow C.

In the power generation cell 10, the resin frame equipped MEA 12 is sandwiched between the metal separators 14. Hereinafter, the metal separator 14 provided on one surface of the resin frame equipped MEA 12 will also be referred to as a "first metal separator 14a", and the metal separator 14 provided on another surface of the resin frame equipped MEA 12 will also be referred to as a "second metal separator 14b". Each of the first metal separator 14a and the second metal separator 14b has a laterally elongated (or longitudinally elongated) rectangular shape.

The resin frame equipped MEA 12 includes a membrane electrode assembly 12a (hereinafter referred to as the "MEA 12a"), and a resin frame member 22 joined to an outer peripheral portion of the MEA 12a, around the outer peripheral portion of the MEA 12a. The MEA 12a includes an electrolyte membrane 23, an anode 24 provided on one surface of the electrolyte membrane 23, and a cathode 26 provided on another surface of the electrolyte membrane 23.

For example, the electrolyte membrane 23 is a solid polymer electrolyte membrane (cation ion exchange membrane). The electrolyte membrane 23 is formed by impregnating a thin membrane of perfluorosulfonic acid with water, for example. The electrolyte membrane 23 is interposed between the anode 24 and the cathode 26. A fluorine based electrolyte may be used as the electrolyte membrane 23. Alternatively, an HC (hydrocarbon) based electrolyte may be used as the electrolyte membrane 23.

As shown in FIG. 2, the anode 24 includes a first electrode catalyst layer 24a joined to one surface 23a of the electrolyte membrane 23 and a first gas diffusion layer 24b stacked on the first electrode catalyst layer 24a. The cathode 26 includes a second electrode catalyst layer 26a joined to another surface 23b of the electrolyte membrane 23 and a second gas diffusion layer 26b stacked on the second electrode catalyst layer 26a.

The resin frame member 22 is a resin film (sub-gasket) having a rectangular frame shape in a plan view, and the inner peripheral portion of the resin frame member 22 is joined to the outer peripheral portion of the MEA 12a. The resin frame member 22 has a constant thickness. In FIG. 1, at one end of the resin frame member 22 in the direction indicated by the arrow B, the oxygen-containing gas supply passage 18a, the coolant supply passage 20a, and the fuel gas discharge passage 16b are provided. At another end of the resin frame member 22 in the direction indicated by the arrow B, the fuel gas supply passage 16a, the coolant discharge passage 20b, and the oxygen-containing gas discharge passage 18b are provided. The shapes of the passages 16a, 16b, 18a, 18b, 20a, 20b provided in the resin frame member 22 are the same as the shapes of the passages 16a, 16b, 18a, 18b, 20a, 20b provided in the first metal separator 14a and the second metal separator 14b, respectively.

Examples of materials of the resin frame member 22 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether resin), PET (polyethylene terephthalate), PBT (polybutylene terephthalate), or modified polyolefin.

The electrolyte membrane 23 may be configured to protrude outward, instead of using the resin frame member 22. Alternatively, frame shaped films may be provided on both sides of the electrolyte membrane 23 protruding outward from the anode 24 and the cathode 26.

The metal separator 14 includes a metal plate 15 as a separator body. Hereinafter, the expression "metal separator 14" is used also in the explanation of the structure of the metal plate 15 itself.

The metal plate 15 of the metal separator 14 is formed by press forming of a metal thin plate to have a corrugated shape in cross section. For example, the metal plate 15 is a steel plate, a stainless steel plate, an aluminum plate, a plate steel plate, or a metal plate having an anti-corrosive surface by surface treatment. Outer peripheral portions of the first metal separator 14a and the second metal separator 14b are joined together by welding, brazing, crimpling, etc. to form a joint separator 32.

The first metal separator 14a has a fuel gas flow field 38 on its surface 14as facing the resin frame equipped MEA 12. The fuel gas flow field 38 is connected to the fuel gas supply passage 16a and the fuel gas discharge passage 16b. Specifically, the fuel gas flow field 38 is formed between the first metal separator 14a and the resin frame equipped MEA 12. The fuel gas flow field 38 includes a plurality of straight flow grooves (or wavy or serpentine flow grooves) extending in the direction indicated by the arrow B.

Figure 4:
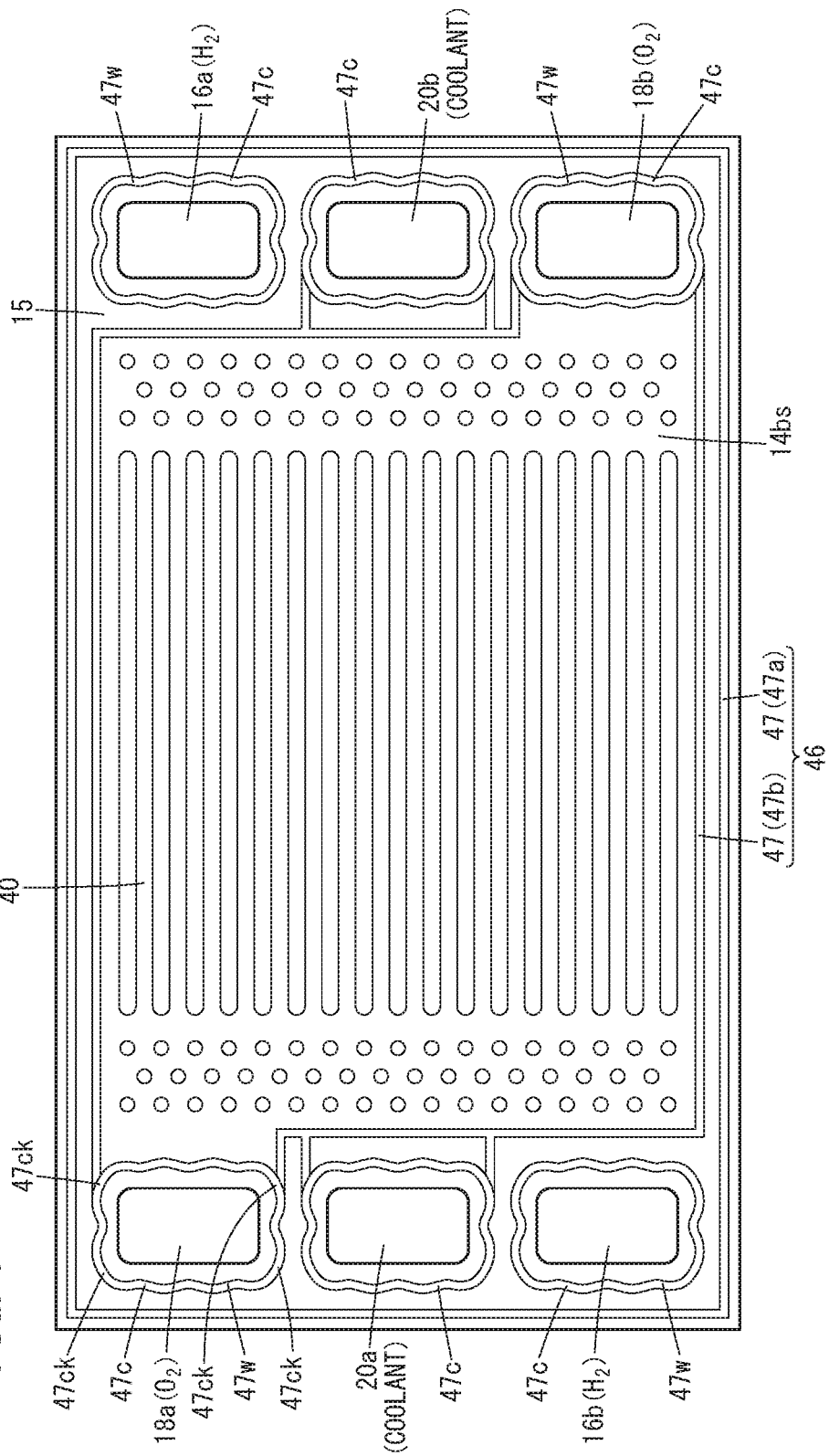
FIG. 4 is a plan view showing a second metal separator.

As shown in FIG. 4, the second metal separator 14b has an oxygen-containing gas flow field 40 on its surface 14bs facing the resin frame equipped MEA 12. The oxygen-containing gas flow field 40 is connected to the oxygen-containing gas supply passage 18a and the oxygen-containing gas discharge passage 18b. Specifically, the oxygen-containing gas flow field 40 is formed between the second metal separator 14b and the resin frame equipped MEA 12. The oxygen-containing gas flow field 40 includes a plurality of straight flow grooves (or corrugated flow grooves) extending in the direction indicated by the arrow B.

In FIG. 1, a coolant flow field 42 is formed between the first metal separator 14a and the second metal separator 14b which are adjacent to each other. The coolant flow field 42 is connected to the coolant supply passage 20a and the coolant discharge passage 20b. The coolant flow field 42 extends in the direction indicated by the arrow B.

A first seal line 44 for preventing leakage of fluid (fuel gas, oxygen-containing gas, or coolant) is formed integrally with the first metal separator 14a, on the surface 14as of the first metal separator 14a facing the MEA 12a by press forming. The first seal line 44 is provided around the outer peripheral portion of the first metal separator 14a. The first seal line 44 is expanded (protrudes) toward the resin frame member 22, and contacts the resin frame member 22 in an air-tight and liquid tight manner.

The first seal line 44 comprises a plurality of bead seals 45 (metal bead seals). The plurality of bead seals 45 include an outer bead seal 45a and an inner bead seal 45b provided inside the outer bead seal 45a. The bead seal 45 (inner bead seal 45b) includes a wavy portion 45w (having a shape formed by connecting a plurality of curves) in a plan view as viewed in the stacking direction of the power generation cells 10, around the passages 16a, 16b, 18a, 18b, 20a, 20b. The inner bead seal 45b is formed around the fuel gas flow field 38, the fuel gas supply passage 16a, and the fuel gas discharge passage 16b, while allowing the fuel gas flow field 38 to be connected to the fuel gas supply passage 16a and the fuel gas discharge passage 16b. The inner bead seal 45b includes passage beads 45c around the passages 16a, 16b, 18a, 18b, 20a, 20b, respectively. A wavy portion 45w is provided between a corner 45ck and another corner 45ck of each of the passage beads 45c.

As shown in FIG. 4, a second seal line 46 for preventing leakage of fluid is formed integrally with the second metal separator 14b, around the outer peripheral portion of the second metal separator 14b, on the surface 14bs facing the MEA 12a by press forming. The second seal line 46 is formed around the outer peripheral portion of the second metal separator 14b. The second seal line 46 is expanded (protrudes) toward the resin frame member 22, and contacts the resin frame member 22 in an air-tight and liquid tight manner. The first seal line 44 and the second seal line 46 face each other through the resin frame member 22. The resin frame member 22 is sandwiched between the first seal line 44 and the second seal line 46.

The second seal line 46 comprises a plurality of bead seals 47 (metal bead seals). The plurality of bead seals 47 includes an outer bead seal 47a and an inner bead seal 47b provided inside the outer bead seal 47a. The bead seal 47 includes a portion 47w having a wavy shape in a plan view as viewed in the stacking direction of the power generation cells 10 (formed by connecting a plurality of curves) around each of the passages 16a, 16b, 18a, 18b, 20a, 20b. The inner bead seal 47b is formed around the oxygen-containing gas flow field 40, the oxygen-containing gas supply passage 18a, and the oxygen-containing gas discharge passage 18b, while allowing the oxygen-containing gas flow field 40 to be connected to the oxygen-containing gas supply passage 18a and the oxygen-containing gas discharge passage 18b. The inner bead seal 47b includes passage beads 47c around the passages 16a, 16b, 18a, 18b, 20a, 20b, respectively. A wavy portion 47w is provided between a corner 47ck and another corner 47ck of each of the passage beads 47c.

As shown in FIG. 2, the bead seals 45, 47 protrude from a base plate 15a of the metal separator 14 (metal plate 15) in the stacking direction of the power generation cells 10 (in the stacking direction of the MEA 12a and the metal separator 14). Specifically, each of the bead seals 45, 47 includes a top 50 spaced from the base plate 15a in the stacking direction, and sides 52, 53 connecting both ends of the top 50 and the base plate 15a. The sides 52, 53 are inclined from the stacking direction, to get closer to each other toward the top 50. In the structure, each of the bead seals 45, 47 is tapered (narrowed) in cross section toward its front end (toward the resin frame member 22). The shapes of the bead seals 45, 47 which face each other through the resin frame member 22 (the plate thickness, the width of the top 50, the inclination angle of the sides 52, 53, and the initial curved shape of the top 50 (upper stage of FIG. 3)) are preferably, but not limited to, the same.

Figure 3:
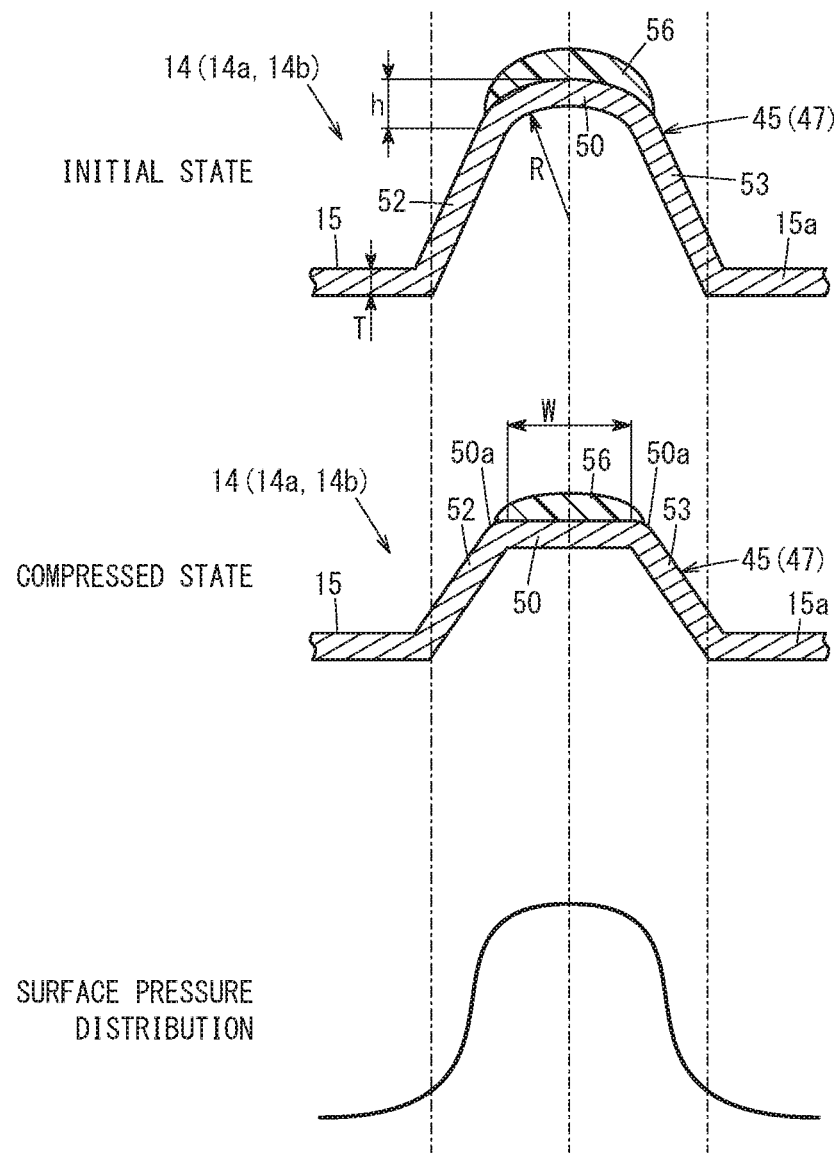
FIG. 3 is a view showing the cross sectional shape and the surface pressure distribution of a bead seal of a metal separator according to a first embodiment of the present invention.

As a result of application of a compression load, the top 50 becomes flat in cross section. The compression load is a load applied to the bead seals 45, 47 when the power generation cells 12 are stacked together to tighten the fuel cell stack. As shown in FIG. 3 (upper stage), in the initial state where no compression load is applied (state before the components of the fuel cell stack are assembled), the top 50 has a curved shape (arc shape) in cross section, expanded in the protruding direction of the bead seal 45.

The height h of the curved top 50 is set so that the top 50 becomes flat when the compression load is applied. Therefore, the height h of the curved top 50 (lift quantity) is made larger as the compression load to be applied to the power generation cells 10 increases.

In the case where the radius of curvature R of the curved top 50 is excessively small (e.g., 1 mm or less), the height h becomes too large, and the top 50 cannot become flat easily when the compression load is applied. In the case where the radius of curvature R of the curved top 50 is excessively large (e.g., 10 mm or more), no peak of the surface pressure is formed at the center of the top 50 in the width direction when the compression load is applied, and the sealing performance is low. Therefore, preferably, the radius of curvature R of the curved top 50 is in the range of 1 mm to 10 mm (1 mm<R<10 mm).

The height h is a distance from the border (where the curve of the top 50 is started) between the side 52 (side 53) and the top 50 to the highest position in the top 50, along the protruding direction of the bead seals 45, 47. Preferably, the plate thickness T of the metal separator 14 is in the range of 0.05 to 0.15 mm. For example, the height h is in the range of 100 to 300% of the plate thickness T of the metal separator 14. It should be noted that the shape having slight unevenness within the tolerance of the plate thickness T (e.g., within 15 μm) is considered as a flat shape.

As shown in FIG. 3 (middle stage), in the state where the compression load is applied (in the state where the components of the fuel cell stack are assembled), the top 50 has a flat shape in cross section, perpendicular to the stacking direction. That is, in the initial state (upper stage of FIG. 3), the top 50 is curved in cross section, in the protruding direction of the bead seals 45, 47. When the compression load is applied (middle stage of FIG. 3), the top 50 is deformed elastically by the compression load to have a flat shape. Stated otherwise, the compression load is applied in a manner that the top 50 becomes flat in cross section. In the middle stage of FIG. 3, small curves 50*a* (R portions) are provided at both ends of the top 50 in the width direction.

In the case where the width W of the flat portion of the top 50 is excessively small (e.g., less than 0.5 mm), the desired surface pressure cannot be achieved when the power generation cells 10 are not in alignment with one another. In the case where the width W of the flat portion of the top 50 is excessively large (e.g., in excess of 1.5 mm), the compression load for generating the required surface pressure becomes excessively large, and the bead seals 45, 47 may be collapsed undesirably. Therefore, preferably, the width W of the flat portion of the top 50 is in the range of 0.5 to 1.5 mm.

In FIG. 2, a resin seal member 56 (micro seal) having both ends thinner than its central position is fixed to the top 50 of each of the bead seals 45, 47 by printing or coating. Therefore, the top 50 of the bead seal 45 contacts the resin frame member 22 through the resin seal member 56. For example, the resin seal member 56 is made of polyester fiber. It should be noted that the resin seal member 56 may be omitted, and the top 50 may directly contact the resin frame member 22. The resin seal member 56 may be provided on the MEA 12*a* side.

Operation of the power generation cell 10 having the above structure will be described below.

As shown in FIG. 1, an oxygen-containing gas is supplied to the oxygen-containing gas supply passage 18*a*, and a fuel gas such as a hydrogen gas is supplied to the fuel gas supply passage 16*a*. Further, a coolant such as pure water, ethylene glycol, or oil is supplied to the coolant supply passage 20*a*.

Therefore, the oxygen-containing gas flows from the oxygen-containing gas supply passage 18*a* to the oxygen-containing gas flow field 40 of the second metal separator 14*b*, and moves in the direction indicated by the arrow B, and the oxygen-containing gas is supplied to the cathode 26 of the MEA 12*a*. In the meanwhile, the fuel gas flows from the fuel gas supply passage 16*a* into the fuel gas flow field 38 of the first metal separator 14*a*. The fuel gas moves along the fuel gas flow field 38 in the direction indicated by the arrow B, and the fuel gas is supplied to the anode 24 of the MEA 12*a*.

Therefore, in the MEA 12*a*, the oxygen-containing gas supplied to the cathode 26 and the fuel gas supplied to the anode 24 are partially consumed in the second electrode catalyst layer 26*a* and the first electrode catalyst layer 24*a* by electrochemical reactions to generate electrical energy.

Then, in FIG. 1, the oxygen-containing gas supplied to, and partially consumed at the cathode 26 is discharged in the direction indicated by the arrow A along the oxygen-containing gas discharge passage 18*b*. Likewise, the fuel gas supplied to, and partially consumed at the anode 24 is discharged in the direction indicated by the arrow A along the fuel gas discharge passage 16*b*.

Further, the coolant supplied to the coolant supply passage 20*a* flows into the coolant flow field 42 between the first metal separator 14*a* and the second metal separator 14*b*, and then, the coolant flows in the direction indicated by the arrow B. After the coolant cools the MEA 12*a*, the coolant is discharged through the coolant discharge passage 20*b*.

In this case, the power generation cell 10 having the metal separator 14 according to the first embodiment offers the following effects and advantages.

Figure 5:
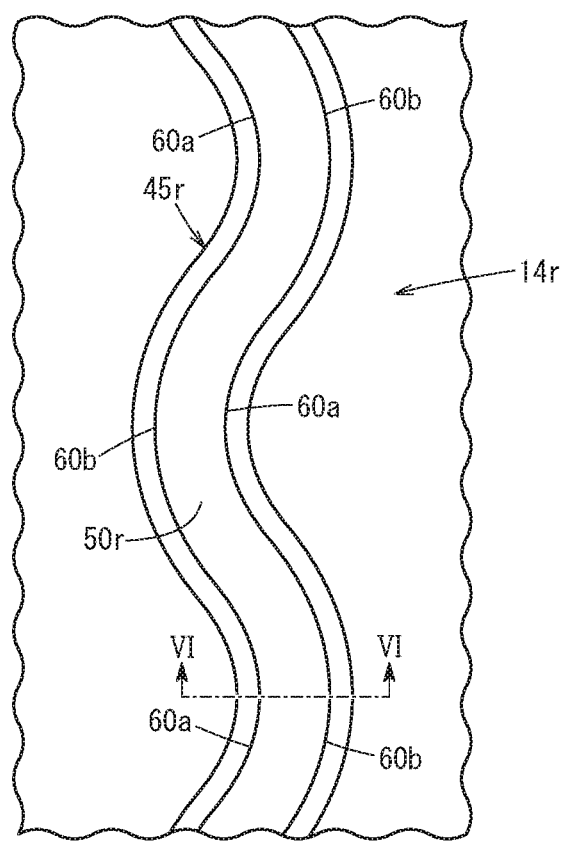
FIG. 5 is a plan view showing a bead seal according to a comparative example.
Figure 6:
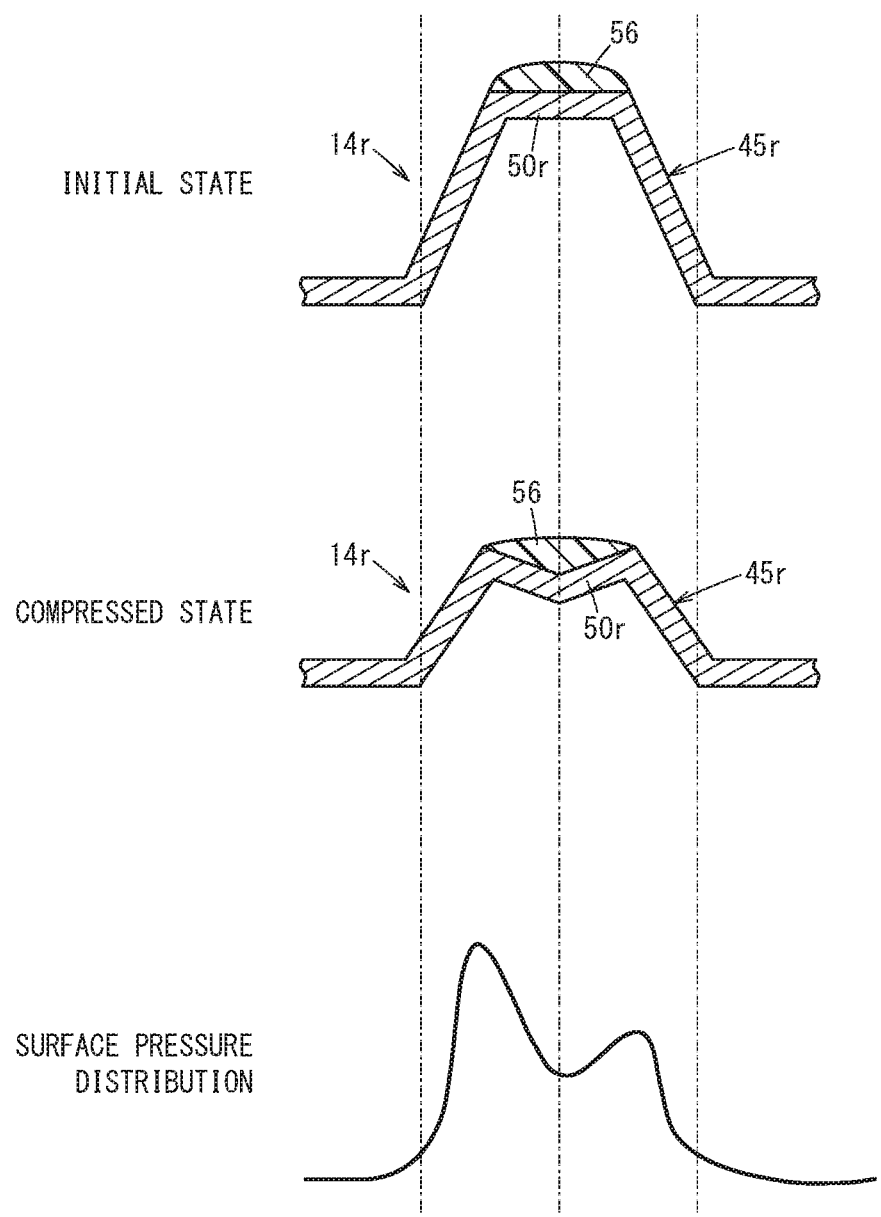
FIG. 6 is a view showing the cross sectional shape and the surface pressure distribution of a bead seal taken along a line VI-VI in FIG. 5.

In FIG. 5, a bead seal 45*r* of a metal separator 14*r* according to a comparative example has a curved shape (wavy shape) in a plan view. As shown in FIG. 6, the bead seal 45*r* of the metal separator 14*r* has a flat shape in cross section in the initial state (upper stage of FIG. 6). Therefore, at the time of applying the compression load (middle stage of FIG. 6), the central portion of a top 50*r* (central portion in the bead width direction) is recessed by deformation. As a result, as shown in the lower stage of FIG. 6, the surface pressure at the central portion of the top 50*r* is decreased, and conversely, the surface pressure at the shoulders of the top 50*r* (both ends in the bead width direction) is increased.

Therefore, the surface pressure is low at some positions in the seal width direction. Under the circumstances, it has been pointed out that the desired sealing performance may not be achieved depending on the surface shape of the bead seal 45*r* (shape viewed in the stacking direction). For example, as shown in FIG. 5, in the bead seal 45*r* having the curved shape (wavy shape), the surface pressure of an inside 60*a* having the curved shape is increased relatively, and the surface pressure of an outside 60*b* having the curved shape is deceased relatively. Therefore, the desired sealing performance cannot be achieved, and the leakage of the fluid may occur undesirably.

In contrast, as shown in FIG. 3, in the metal separator 14 according to the first embodiment, the top 50 of each of the bead seals 45, 47 has a flat shape in cross section as a result of application of the compression load. In the structure, at the time of compression, the top 50 of each of the bead seals 45, 47 is deformed from the curved shape to the flat shape. Thus, local decrease or increase in the seal surface pressure can be prevented. As a result, as shown in the lower stage of FIG. 3, the surface pressure distribution at the top 50 in the seal width direction become uniform, and it becomes possible to improve the sealing performance.

The bead seals 45, 47 have a curved shape in a plan view as viewed in the stacking direction. As described above, in the case of the bead seals 45, 47 having a curved shape in a plan view, the sealing performance tends to be degraded easily due to the curved shape. Therefore, in the bead seals 45, 47, since the top 50 has a flat shape when the compression load is applied, it is possible to effectively prevent the decrease in the sealing performance caused by the curved shape in the curved portions 45w, 47w (see FIGS. 1 and 4).

In the state where no compression load is applied, the shape of the top 50 in cross section has a curved shape expanded in the protruding direction of the bead seals 45, 47. With the simple and economical structure, at the time of applying the compression load, it is possible to deform the top 50 of each of the bead seals 45, 47 to become flat.

The height h of the curved top 50 is made larger as the compression load to be applied increases. Therefore, at the time of applying the compression load, it is possible to reliably deform the top 50 of each of the bead seals 45, 47 to become flat.

Figure 7:
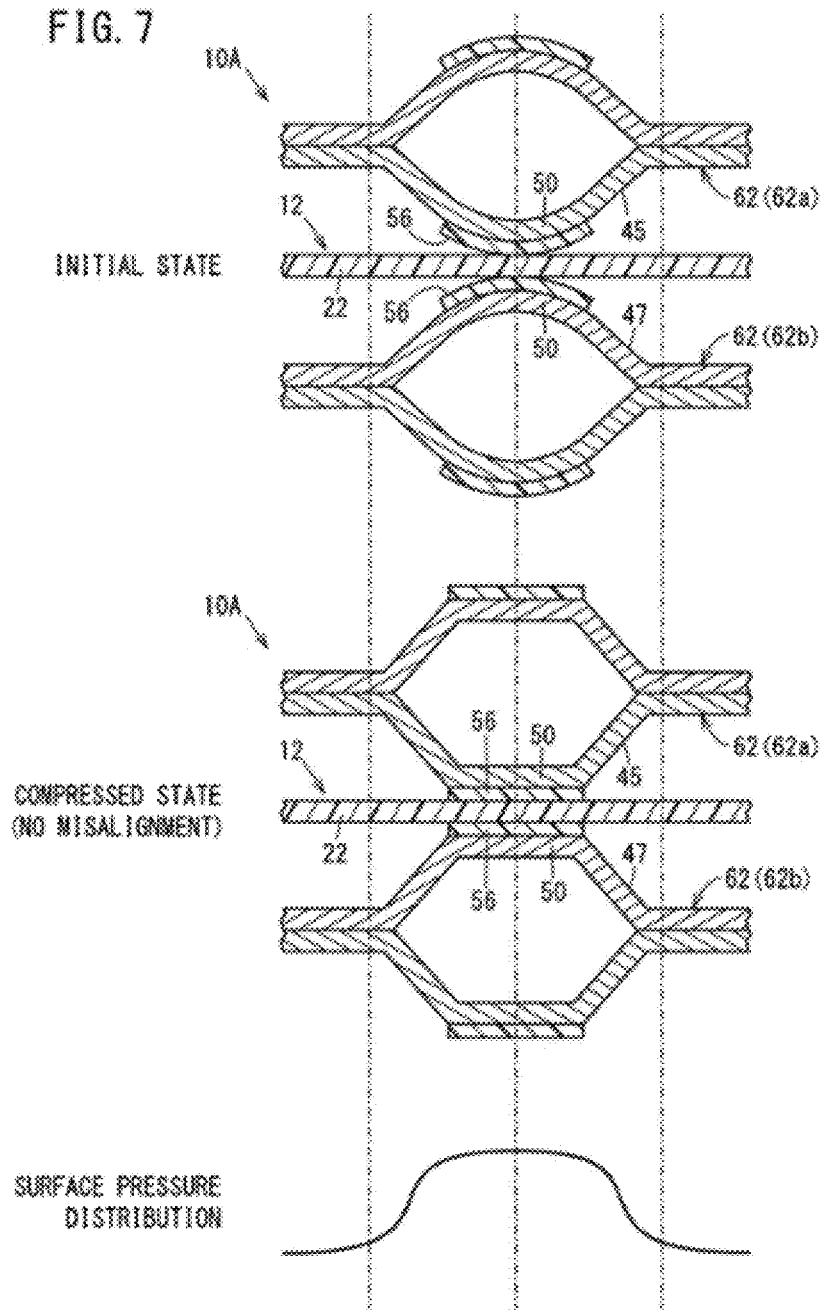
FIG. 7 is a view showing the cross sectional shape and the surface pressure distribution of a bead seal of a metal separator according to a second embodiment of the present invention.

In a power generation cell 10A including metal separators 62 (first metal separator 62a and second metal separator 62b) according to the second embodiment shown in FIG. 7, a resin seal member 56 in the form of a film having constant thickness in the seal width direction is provided at the top 50 of each of the bead seals 45, 47. In the initial state (upper stage of FIG. 7) before the compression load is applied, the resin seal members 56 are curved as well in correspondence with the curved shape of top 50 of each of the bead seals 45, 47.

In the state where the compression load is applied (middle stage of FIG. 7), when the top 50 is deformed to have a flat shape, the resin seal member 56 is deformed to have a flat shape as well. In the case where no misalignment is present in a direction perpendicular to the stacking direction, between the bead seals 45, 47 which face each other through the resin frame member 22, as shown in the lower stage of FIG. 7, the surface pressure at the top 50 becomes substantially uniform over the entire area in the seal width direction.

Figure 9:
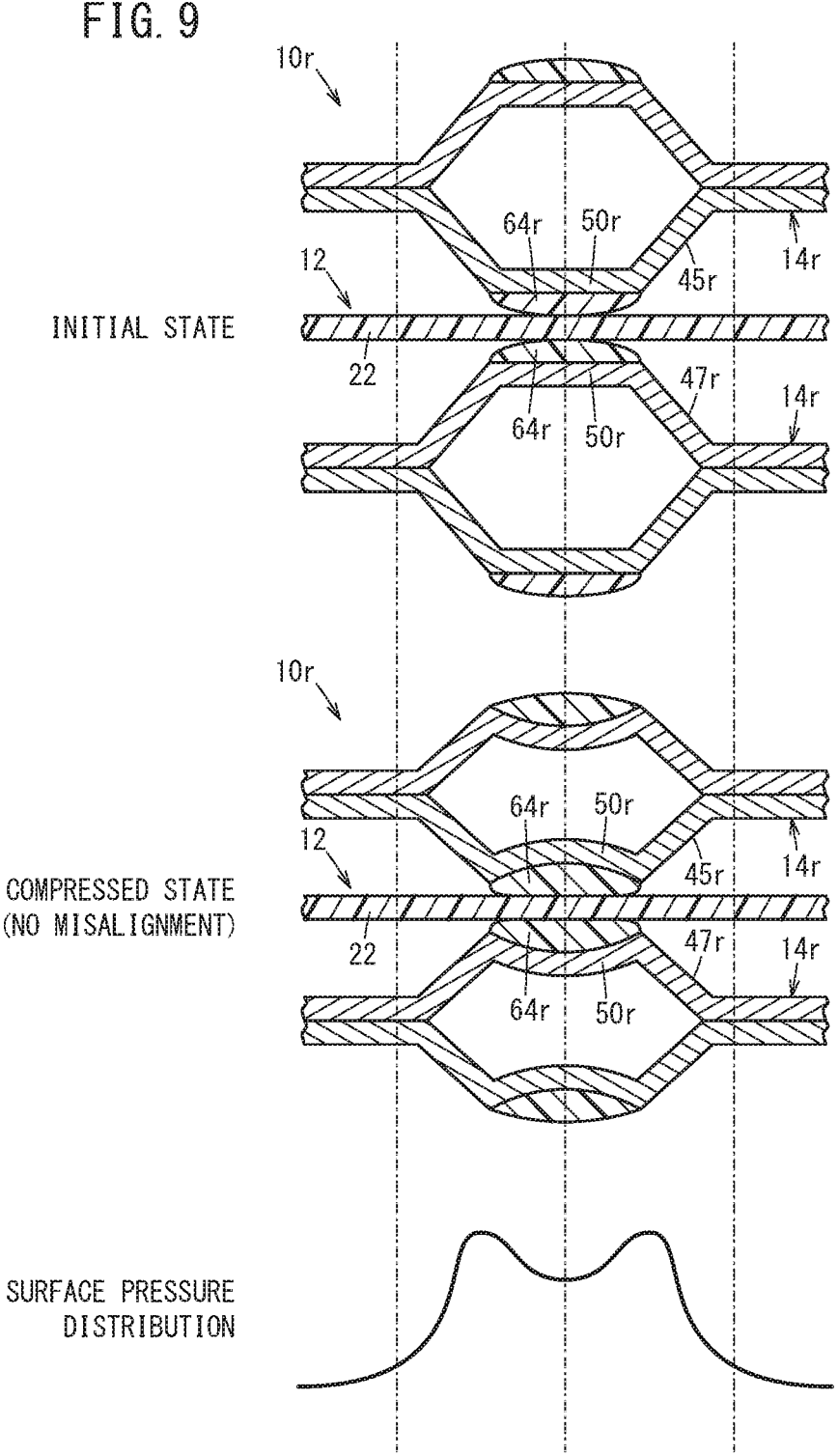
FIG. 9 is a view showing the cross sectional shape and the surface pressure distribution of a bead seal of a metal separator according to a comparative example.

In this regard, in a power generation cell 10r according to a comparative example shown in FIG. 9, in the initial state before application of the compression load (upper stage of FIG. 9), the top 50r of each of the bead seals 45r, 47r has a flat shape. A convex resin seal member 64r where the central portion in the width direction is thicker than both ends in the width direction is provided at the top 50r. When the compression load is applied (middle stage of FIG. 9), the top 50r of each of the bead seals 45r, 47r is deformed. In the case where no misalignment is present in the surface direction (perpendicular to the stacking direction) at the time of compression, in the surface pressure distribution (lower stage of FIG. 9) at the top 50r, the surface pressure at the central portion in the width direction is lower than the surface pressure at both ends in the width direction.

Figure 10:
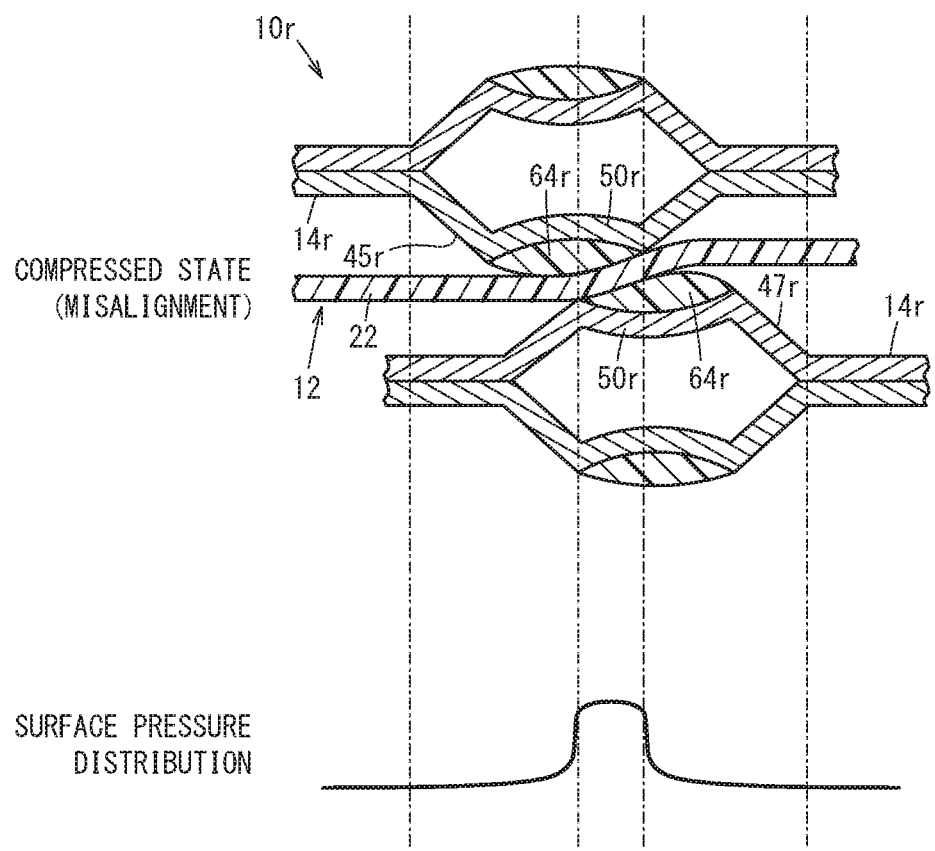
FIG. 10 is a view showing the cross sectional shape and the surface pressure distribution of a bead seal (with misalignment at the time of compression) of the metal separator according to the comparative example.

In contrast, when misalignment is present in the surface direction at the time of compression, as shown in FIG. 10, the resin frame member 22 is sandwiched between thin portions of the resin seal members 64r which face each other through the resin frame member 22. Therefore, the surface pressure at the top 50r is lowered, and the seal width is reduced. As a result, the sealing performance is lowered. In order to achieve the desired seal performance, it is required to apply the high compression load. If the width of the top 50r is designed to have a large value beforehand, it may be possible to suppress the decrease in the sealing performance. However, this design is disadvantageous in terms of size reduction of the metal separator 14r.

Figure 8:
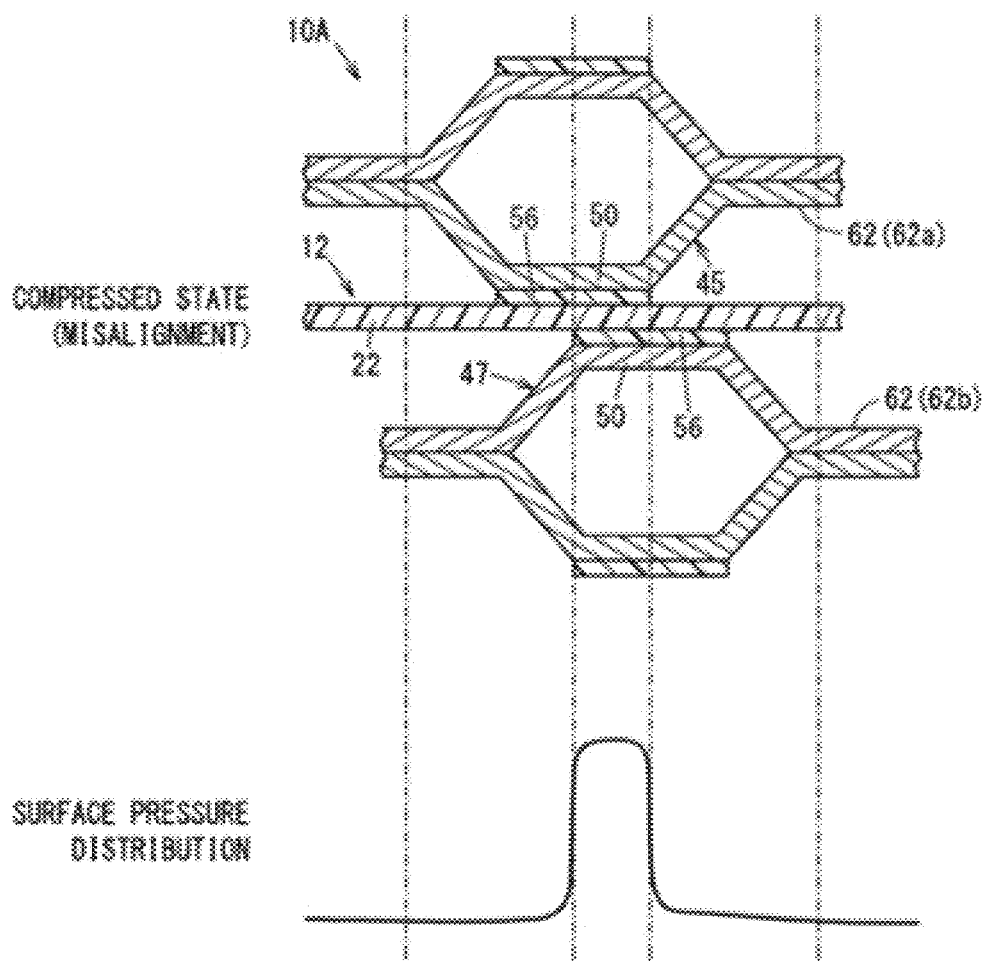
FIG. 8 is a view showing the cross sectional shape and the surface pressure distribution of a bead seal (with misalignment at the time of compression) of the metal separator according to the second embodiment of the present invention.

In contrast, as shown in FIG. 7, in the metal separator 62 according to the second embodiment, in the state where the compression load is applied, the top 50 of the bead seal 45 becomes flat, and the thickness of the resin seal member 56 is constant in the seal width direction of the bead seal 45. Therefore, as shown in FIG. 8, even if misalignment is present in the surface direction (perpendicular to the stacking direction) at the time of compression, the surface pressure is not decreased. Accordingly, even if the high compression load is not applied excessively, it becomes possible to achieve the desired sealing performance. By decreasing the compression load, it becomes possible to reduce the plate thickness of the metal separator 62 and contribute to the reduction in the thickness of the power generation cell 10A and the size of the fuel cell stack. Further, since it is not necessary to design the seal width to have an excessively large size, size reduction of the metal separator 62 is achieved advantageously.

The present invention is not limited to the above embodiments. Various modifications can be made without departing from the gist of the present invention.

What is claimed is:

1. A power generation cell comprising:
a membrane electrode assembly including an electrolyte membrane and electrodes provided on both sides of the electrolyte membrane; and
metal separators stacked on both sides of the membrane electrode assembly in a stacking direction, respectively,
the fuel cell metal separators each including a bead seal protruding in the stacking direction, the bead seal configured to prevent leakage of a fuel gas, an oxygen-containing gas, or a coolant as fluid when pressed by a tightening load against a resin frame member joined to an outer peripheral portion of the membrane electrode assembly, the tightening load being applied to the power generation cell in the stacking direction,
wherein a top of the bead seal has a curved shape in cross section that is elastically deformed into a flat shape by the tightening load applied for forming a fuel cell stack,
a radius of curvature of the curved shape and the tightening load applied to the top of the bead seal are set in a manner that the top of the bead seal is elastically deformed from the curved shape to the flat shape by the tightening load applied to the curved shape, and
wherein the top of the bead seal is flattened by deformation via the tightening load to achieve a uniform surface pressure distribution between the top of the bead seal and the resin frame member.

2. The power generation cell according to claim 1, wherein the bead seal has a wavy shape in a plan view as viewed in the stacking direction.

3. The power generation cell according to claim 2, wherein a passage extends through the fuel cell metal separators in the stacking direction, and is configured to supply or discharge the fluid;
the bead seal includes a passage bead surrounding the passage; and
the wavy shape is positioned between a corner and another corner of the passage bead.

4. The power generation cell according to claim 1, wherein a resin seal member having a constant thickness in a seal width direction is provided at the top.

5. The power generation cell according to claim 1, wherein in a state where the tightening load is not applied, the top has the curved shape in cross section expanded in a protruding direction of the bead seal.

6. The power generation cell according to claim 5, wherein a height of the curved shape of the top is made larger as the tightening load to be applied increases.

7. The power generation cell according to claim 5, wherein a height of the curved shape of the top is largest at a central portion in a seal width direction.

8. The power generation cell according to claim 1, wherein in a state where the tightening load is not applied, the curved shape is arched in cross section expanded in a protruding direction of the bead seal.

9. The power generation cell according to claim 1, further comprising a resin seal member provided on the top of the bead seal and configured to abut on the resin frame member,
   wherein the resin frame member is sandwiched and held between the resin seal member of one of the metal separators and the resin seal member of another of the metal separators.

10. The power generation cell according to claim 1, wherein the radius of curvature is in a range of 1 mm to 10 mm.

11. The power generation cell according to claim 1, wherein a plate thickness of each of the metal separators is in a range of 0.05 mm to 0.15 mm.

12. The power generation cell according to claim 11, wherein a height of the curved shape of the top of the bead seal is in a range of 100% to 300% of the plate thickness.

* * * * *